United States Patent [19]

Wachsman et al.

[11] 3,830,139

[45] Aug. 20, 1974

[54] PNEUMATIC ACTUATOR

[75] Inventors: Mordechai Wachsman, Tel Aviv; Shlomo Kann, Ramat Gan, both of Israel

[73] Assignee: P.M.L. Precision Mechanisms Ltd., Industrial Zone, Yahud, Israel

[22] Filed: July 31, 1972

[21] Appl. No.: 276,367

[52] U.S. Cl. ............................ 92/9, 92/12, 92/13.5, 92/13.8, 188/282, 188/286
[51] Int. Cl. ............................................ F15b 15/22
[58] Field of Search .......... 92/8, 9, 10, 11, 12, 13.5, 92/13.8, 62, 85; 188/282, 286

[56] References Cited
UNITED STATES PATENTS

| | | | |
|---|---|---|---|
| 2,019,969 | 11/1935 | Holmes | 92/8 X |
| 3,313,214 | 4/1967 | Ackerman | 92/12 X |
| 3,424,061 | 1/1969 | Brooks | 92/12 |
| 3,678,805 | 7/1972 | Weyman | 92/11 |

*Primary Examiner*—Irwin C. Cohen
*Assistant Examiner*—Abraham Hershkovitz
*Attorney, Agent, or Firm*—Browdy and Neimark

[57] ABSTRACT

A pneumatic actuator whose rate of displacement during a stroke changes in a controlled manner includes an annular pneumatic chamber defined by concentric tubular members, on the inner one of which is a slideable sleeve having an annular pneumtic piston on one axial end engaged with the inside of the outer tubular member. The inner tubular member defines a closed hydraulic cylinder within which is reciprocably mounted an hydraulic piston carried by a rod that extends axially into the hydraulic cylinder. Hydraulic fluid is conducted by an adjustably constricted conduit across the hydraulic piston during the advance movement of the latter from one end of the hydraulic chamber to the other. During retract movement in the opposite direction, hydraulic fluid is conducted, substantially unimpeded by a check valve, across the piston. Cooperable means on the rod and on the sleeve are engageable after a predetermined displacement of the pneumatic piston in both the advance and retract direction of movement for imparting movement to the hydraulic piston.

3 Claims, 4 Drawing Figures

PNEUMATIC ACTUATOR

This invention relates to a pneumatic actuator whose rate of displacement during a stroke changes in a controlled manner.

Because the power source of pneumatic actuators is a compressed gas, e.g., air, a considerable amount of energy can be stored in a relatively small space; and such actuators are advantageous in installations with space limitations. When a pneumatic actuator is applied to a machine tool, the rapid expansion of a compressed gas during the initial part of the stroke of the actuator is advantageous because it permits a tool to be advanced rapidly from its rest position to its work position. During the terminal portion of the stroke, however, where the tool is fed into the workpiece by the actuator, the rate of displacement should be considerably slower and compatible with the requirements of the machining operation involved. For example, in a pneumatically operated drilling tool, the stroke of the actuator is advantageously divided into two phases; a take-up phase characterized by a relatively rapid displacement of the drill by which the tip is advanced from a cleared position relative to the workpiece to a position adjacent the workpiece; and a tool-feed phase characterized by relatively slow displacement of the drill by which it is fed into the workpiece.

In order to provide such a two phase advance during the stroke of the actuator, the motive gas entering the actuator may be throttled at the desired point in the stroke. In many cases, however, this solution has been found to be unsatisfactory because the compressibility of the motive gases renders it difficult to obtain a smooth transition in the stroke, and throttling of the motive of gas is accompanied by some vibration of the actuator which is referred to in the art as "chatter" or "flutter." Such vibration has a deleterious effect on the quality of the machining operation carried out by the actuator.

In order to provide more control over a pneumatically actuated device, it is conventional to provide an auxiliary hydraulic cylinder whose piston is mechanically coupled to the pneumatic piston such that both pistons move together as a unit. When motive gas is applied to advance the pneumatic piston, the hydraulic piston is likewise displaced forcing hydraulic fluid in front of the piston through an adjustably constricted conduit to a region behind the piston. The rate of advance is thus dependent on the constriction in the conduit and provides the necessary control. Conventionally, the hydraulic piston is provided with a check valve arrangement which opens when the pneumatic piston is retracted permitting hydraulic fluid to flow substantially unimpeded across the face of the hydraulic piston thus effecting a rapid return of the actuator to its initial position.

While this arrangement eliminates chatter or flutter, it is disadvantageous in many instances. For example, when the auxiliary hydraulic cylinder is at all times mechanically coupled to the pneumatic piston, it is not possible to obtain a two-phase type of operation unless a complicated valving arrangement is provided for changing the constriction in the conduit during the stroke of the actuator. Furthermore, the separate auxiliary hydraulic cylinder must be mounted either in alignment with or parallel to the pneumatic piston. Such mounting renders the complete device bulky and increases the space required for its installation. Furthermore, where two pistons are mounted in parallel and their rods are mechanically coupled, eccentric shear forces act on the rods which may fail as a result during an advance stroke with a consequential uncontrolled advance of the pneumatic piston and subsequent damage to the tool or workpiece or the pneumatic piston itself.

It is therefore an object of the present invention to provide a new and improved pneumatic actuator whose rate of displacement changes during a stroke in a controlled manner in which the above referred to disadvantages are substantially reduced or overcome.

In the present specification and claims the terms "pneumatic actuator" or "pneumatic device" are used to signify any pneumatic prime mover comprising a piston reciprocable in a cylinder and adapted for connection thereto of any desired functional member, e.g., a tool.

According to the present invention, there is provided a pneumatic actuator whose rate of displacement during a stroke changes in a controlled manner comprising: a body having concentric tubular members defining an annular pneumatic chamber; a sleeve slidable on the outside of the inner tubular member and having an annular pneumatic piston on one axial end engaged with the inside of the outer tubular member; means on the inner tubular member defining a closed hydraulic cylinder; a rod extending axially into the hydraulic cylinder and terminating at one end in an hydraulic piston reciprocally mounted within the hydraulic cylinder; an hydraulic conduit means for conducting hydraulic fluid across the hydraulic piston during movement of the latter in the hydraulic cylinder; adjustable control means associated with the conduit means for controlling the rate of flow of hydraulic fluid across the hydraulic piston during advance movement of the latter in the hydraulic cylinder; pneumatic ports in the body by which motive gas may be selectively applied to the annular chamber on either side of the pneumatic piston for selectively moving the latter in either the advance or the retract direction; and cooperable means on the rod and on the sleeve engageable after predetermined displacement of the pneumatic piston in both the advance and retract direction for imparting movement to the hydraulic piston.

The pneumatic device according to the invention is thus a compact unit whose size is substantially the same as that of a similar pneumatic unit devoid of the built-in hydraulic braking device. This in itself is a considerable advantage.

A further advantage of the device according to the invention resides in the fact that all forces are central with practically no shearing forces so that the device is more reliable than known combinations of a pneumatic device and a separate unit serving as hydrocheck.

The invention is illustrated, by way of example only, in the accompanying drawings in which.

Figure 1:
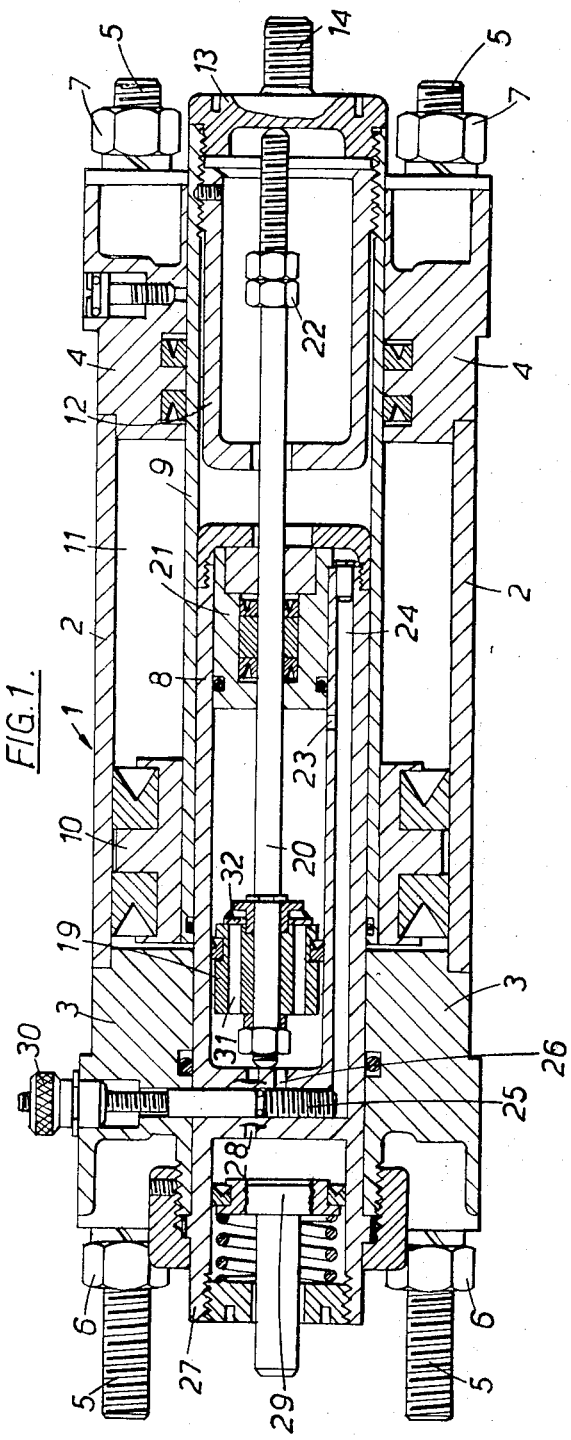
FIG. 1 is a longitudinal section through one embodiment of a device according to the invention in the inoperative starting position.
Figure 2:
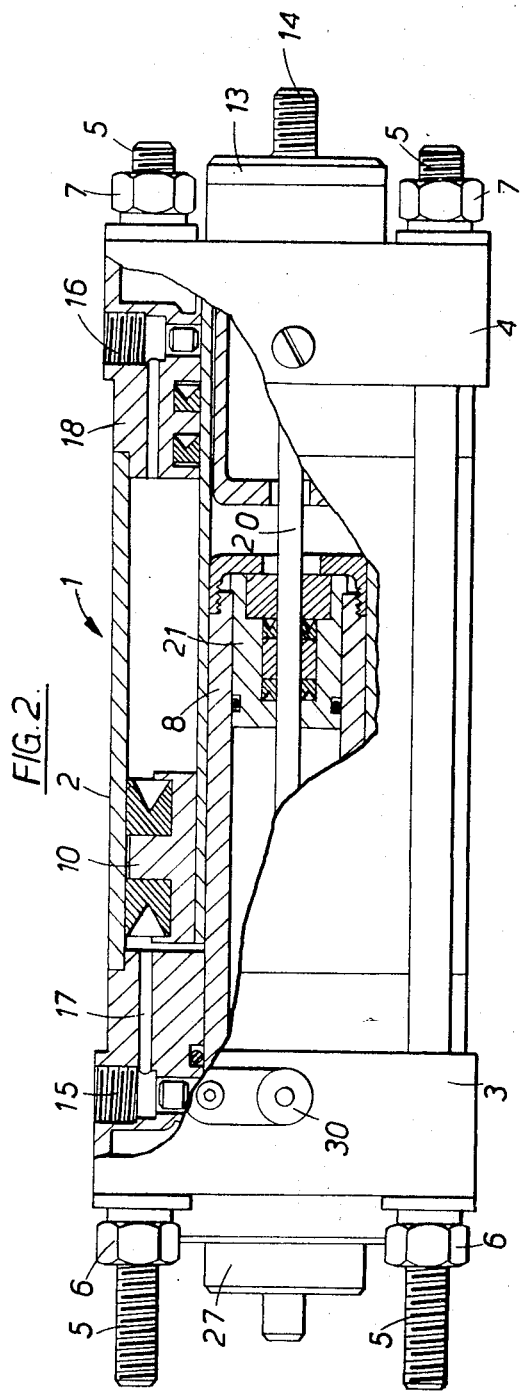
FIG. 2 is an elevation, partly broken open, of the device of FIG. 1 turned by 90°.
Figure 3:
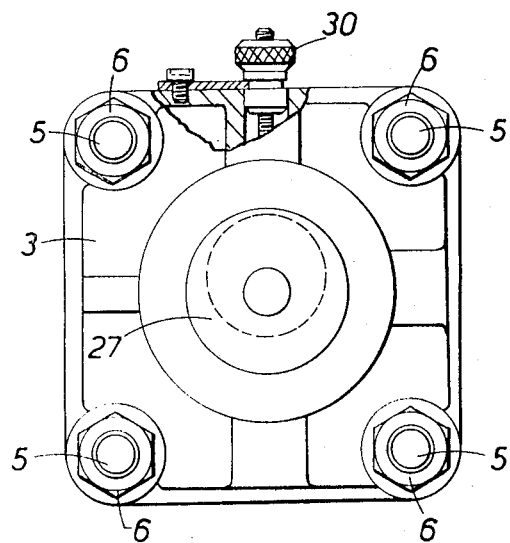
FIG. 3 is a side elevation of the device according to FIGS. 1 and 2.

The embodiment of FIGS. 1 – 3 comprises a body 1 assembled from a central cylindrical portion 2 and terminal plugs 3 and 4. The assembly is held together by means of four identical bolts 5 cooperating each with a pair of nuts 6 and 7.

Within body 1 is located a hydraulic cylinder 8 partly surrounded by a tubular shaft 9 of an annular pneumatic piston 10 reciprocable within a pneumatic chamber 11. A shaft in the form of a sleeve 9 comprises at its fore end an integral hollow cup-like chamber 12 and it is sealed off by a terminal plug 13 comprising a screw-threaded boss 14 adapted for mounting thereon a working tip. Sockets 15 and 16 are adapted for connection to a source of compressed gas, e.g., air, and they communicate with the pneumatic chamber 11 through channels 17 and 18, respectively.

Located within cylinder 8 is a hydraulic piston 19 keyed on a shaft or rod 20 extending through a plug 21 into cup 12. The end portion of shaft 20 is screw-threaded and mounted thereof is a pair of nuts 22 whose position on the shaft is adjustable.

Cylinder 8 is permanently filled with hydraulic liquid. The space in front of piston 19 communicates with the space in the rear thereof through a bore 23, a channel 24, a needle valve 25 and a further bore 26. Needle valve 25 is of the screw-threaded type so that on its way from channel 24 to bore 26 the hydraulic liquid has to pass through the constricted passage formed by the screw thread. By adjustment of the valve this constricted passage is lengthened or shortened, as the case may be, whereby the resistance to the liquid passage is increased or decreased.

A sealed chamber 27 serves as hydraulic liquid reservoir, the liquid being under pressure by the action of a spring-loaded piston 29. Chamber 27 communicates with the space in the rear of piston 19 by means of an off-centre bore 28.

Needle valve 25 is adjustable by means of a knob 30.

The hydraulic piston 19 comprises two axial bores 31 fitted each at the front end with a flap 32.

In FIGS. 1 and 2, pistons 10 and 19 are shown in the starting position. In this position compressed air is fed into the device through socket 15 and penetrates through channel 17 into the pneumatic chamber 11 at the rear of piston 10 thereby advancing the latter with its hollow shaft 9. At the beginning of the advance stroke the hydraulic piston 19 is not affected by this movement which thus proceeds unhindered and very rapidly until the rear wall or partition of cup 12 abuts nuts 22. When this occurs the two pistons are coupled with each other and upon further advance of piston 10, piston 19 is carried along with it and exerts a braking effect due to the fact that it advances against the resistance of the hydraulic liquid. Due to the advance of piston 19 hydraulic liquid is driven from the front part of cylinder 8 through bore 23, channel 24, needle valve 25 and bore 26 into the rear part of cylinder 8, the rate of the liquid displacement and with it the rate of progress of piston 19 and consequently also of piston 10 being determined by the adjustment of needle valve 25. During the advance stroke of piston 19 the sealing flaps 32 of bores 31 remain closed due to the hydraulic pressure on them.

The retract stroke of piston 11 is brought about by compressed air introduced through socket 16 and channel 18. At first piston 19 does not move until plug 13 abuts the free end of rod 20 whereupon the rod and the piston are pushed rearwards. Hydraulic liquid now flows through bores 31 from left to right and in so doing keeps flaps 32 open. The diameter of bores 31 is so selected that the resistance to the retract stroke of the piston is minimized and consequently no substantial braking of the retract stroke of piston 11 occurs.

Any losses of hydraulic liquid due to leakage are made up by fresh fluid supplied to the rear of piston 19 through bore 28 from reservoir 27 by the action of the spring-loaded piston 29.

Instead of adjusting nuts 22 to change the point during the advance displacement of the actuator at which the braking action occurs, a fixed stop or abutment can be provided on rod 20, and an axially displaceable sleeve can be threaded into the aperture in the bottom of cup 12 through which the rod passes.

Figure 4:
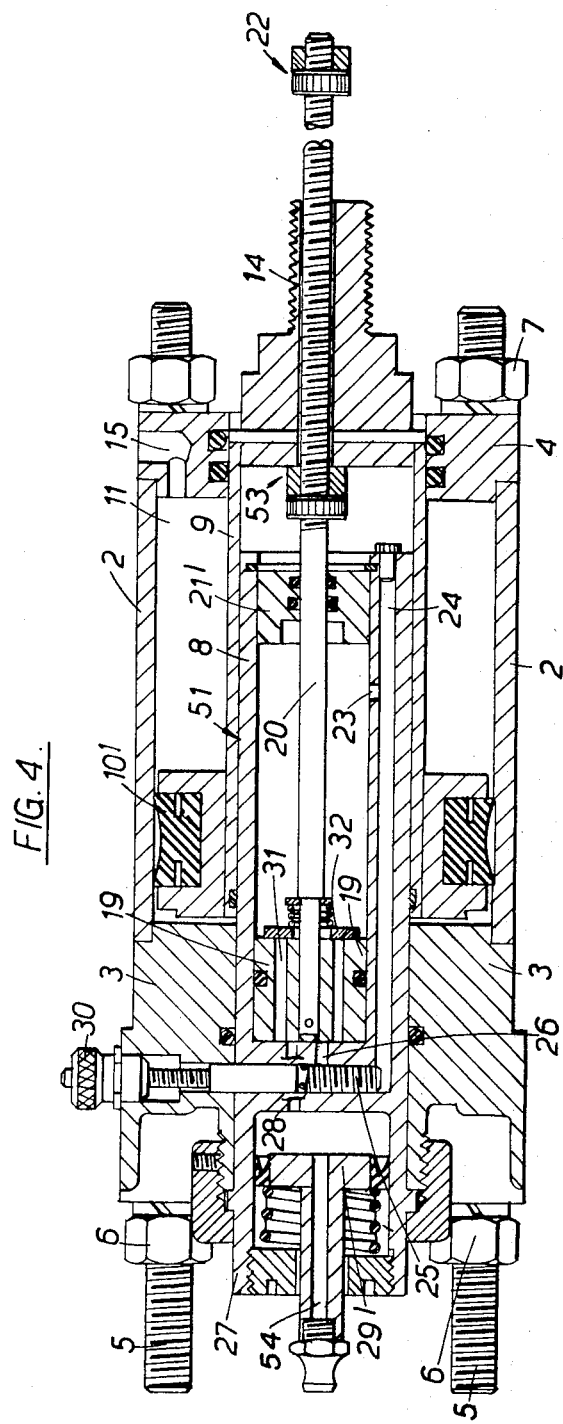
FIG. 4 is a longitudinal section through another embodiment of a device according to the invention.

The embodiment of FIG. 4 is similar to the embodiment of FIGS. 1 – 3, differing essentially in that cup 12 is eliminated and rod 20 of the hydraulic piston projects through a central aperture in the boss 14 attached to the pneumatic piston, and the free end of the boss engages the nuts 22 on rod 20. As in the previous embodiment, concentric tubular members 2 and 8 define an annular pneumatic chamber 11; and sleeve 9 is slidable on the outside of the inner tubular member 8. An annular pneumatic piston 10' on one axial end of the sleeve 9 has suitable seals on its periphery engaged with the inside of the outer tubular member 2. A plug 21' held by a snap ring or the like in the bore of tube 8 closes one end of this tube and defines a hydraulic cylinder 51. A rod 20, coaxial with the tubular members 2 and 8, extends into the hydraulic cylinder and terminates in a hydraulic piston 19 reciprocable within the hydraulic cylinder 51.

Aperture 23 interconnects the hydraulic cylinder 51 with the axially extending bore 24 and forms therewith an hydraulic conduit for conducting hydraulic fluid across the hydraulic piston 19 during the advance movement of the latter (e.g., from right to left as shown in FIG. 4) from one end of the hydraulic cylinder to the other. Needle valve 25 provides an adjustable constriction in the conduit for controlling the rate of flow of hydraulic fluid through orifice 26, and hence the rate at which the piston 19 can advance.

In operation, motive gas, preferably air, is introduced into the pneumatic chamber 11 through a suitable port (not shown in FIG. 4) to cause the pneumatic piston to begin its advance stroke. The resultant movement of slide 9, to which boss 14 is rigidly attached, is rapid and unimpeded until boss 14 engages nuts 22 attached to the free end of rod 20. At this time further movement of the sleeve 9 in response to the gas pressure in chamber 11 imparts movement to hydraulic piston 19. The rate of displacement of boss 14 thus decreases in accordance with the rate at which hydraulic fluid is permitted to flow across piston 19. The setting of the needle valve 25 establishes such rate. At the end of the advance stroke, the pneumatic piston 10' is adjacent the terminal plug 4 and the hydraulic piston 19 is adjacent plug 21'.

The retract stroke occurs when motive gas is introduced through port 15 moving the piston 10' from its position adjacent terminal plug 4 back to the position shown in FIG. 4. The initial retraction of the sleeve 9 occurs without imparting any movement to the rod 20 and continues until the boss 14 engages the pair of nuts 53 attached to the rod 20. When this occurs, further movement of the boss 14 in the retract direction forces piston 19 toward terminal plug 3. The hydraulic fluid in front of the piston 19 passes through the axial apertures 31 unseating washer 32 on the shaft 20 against the spring pressure and permitting a substantially unimpeded flow of hydraulic fluid across the piston face. Eventually, the motive gas in chamber 51 drives the elements back to the position shown in FIG. 4.

The free end of rod 20 is threaded for permitting the two pairs of nuts 22 and 53 to be adjustably positioned on the rod. As a result, these nuts constitute cooperable means on the rod and on the sleeve engageable after a predetermined displacement of the pneumatic piston in both the advance and retract directions for imparting movement to the hydraulic piston. One advantage of the arrangement shown in FIG. 4 is the ease with which an adjustment can be made to the point during the advance of the pneumatic piston at which the hydraulic cylinder is engaged. Both of the pairs of nuts are accessible for adjustment, the nuts 53 being accessible when the pins holding the boss 14 to the sleeve 9 are removed, and boss 14 is withdrawn from sleeve 9. If desired, a fixed stop can be provided on rod 20 rather than adjustable nuts 22; and in such case, an adjustable sleeve can be provided on the free end of boss 14.

To facilitate charging the system with hydraulic fluid, piston 29' may be provided with a central bore permitting attachment of hydraulic fitting 54 through which fluid can be injected into the reservoir 27.

What is claimed is:

1. A pneumatic actuator having a controllable rate of displacement comprising:
   a. a body having fixed concentric tubular members defining an axially extending annular pneumatic chamber and a central hydraulic chamber adapted to contain hydraulic fluid;
   b. a sleeve engaged over the inner tubular member for axial sliding movement thereon, and having, at one end, an annular pneumatic piston operatively engaged with the pneumatic chamber, and, at the other end, means for attachment to a device to be actuated;
   c. means on the body to selectively introduce motive gas into the pneumatic chamber on either side of the pneumatic piston for selectively moving the sleeve in opposite directions between terminal axial positions;
   d. a control rod extending axially into the hydraulic chamber and having attached thereto an hydraulic piston operatively engaged with the hydraulic chamber;
   e. coupling means between the control rod and the sleeve for causing both the rod and the sleeve to move together as a unit during at least a portion of the movement in either direction of the sleeve between its terminal axial positions;
   f. hydraulic conduit means interconnecting the opposite sides of the hydraulic piston for effecting transfer of hydraulic fluid in the hydraulic chamber from one end to the other upon movement therein of the hydraulic piston;
   g. a control valve in the conduit means establishing a constriction for controlling the rate of flow of hydraulic fluid therein;
   h. relief means, effective when the sleeve and rod move as a unit in one direction only, for effecting the transfer of hydraulic fluid from one end of the hydraulic cylinder to the other independently of the control valve; and
   i. a boss on the end of the sleeve opposite the pneumatic piston, which boss has an axially directed aperture through which the control rod freely passes and extends beyond the boss, the coupling means comprising the free end of the boss and a stop on the rod located beyond the boss.

2. A pneumatic actuator according to claim 1 wherein the stop is axially adjustable on the rod.

3. A pneumatic actuator according to claim 1 wherein the coupling means comprises a second stop located on the rod between the hydraulic piston and the boss.

* * * * *